US012786860B2

(12) United States Patent
Takeuchi

(10) Patent No.: US 12,786,860 B2
(45) Date of Patent: Nov. 3, 2026

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Takuya Takeuchi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 18/618,902

(22) Filed: Mar. 27, 2024

(65) Prior Publication Data

US 2024/0334315 A1 Oct. 3, 2024

(30) Foreign Application Priority Data

Mar. 29, 2023 (JP) ................................ 2023-053293

(51) Int. Cl.

| | |
|---|---|
| ***H04W 48/16*** | (2009.01) |
| ***H04W 12/03*** | (2021.01) |
| ***H04W 48/08*** | (2009.01) |

(52) U.S. Cl.

CPC ........... *H04W 48/16* (2013.01); *H04W 12/03* (2021.01); *H04W 48/08* (2013.01)

(58) Field of Classification Search

CPC . G06F 3/1236; G06F 3/1292; H04L 63/0428; H04L 63/18; H04L 63/205; H04W 12/03; H04W 12/37; H04W 12/50; H04W 48/08; H04W 48/16; H04W 8/005; H04W 84/12

See application file for complete search history.

(56) References Cited

U.S. PATENT DOCUMENTS

| | | | | |
|---|---|---|---|---|
| 2005/0005042 A1* | 1/2005 | Fukunaga | G06F 9/4413 | 710/62 |
| 2006/0002352 A1* | 1/2006 | Nakamura | H04L 41/0816 | 370/338 |
| 2010/0157960 A1* | 6/2010 | Banerjee | H04L 67/34 | 370/338 |

(Continued)

FOREIGN PATENT DOCUMENTS

| | | | |
|---|---|---|---|
| EP | 3547760 B1 * | 11/2022 | H04W 12/068 |
| JP | 2020123810 A | 8/2020 | |

*Primary Examiner* — Babar Sarwar

(74) *Attorney, Agent, or Firm* — Canon U.S.A., Inc. IP Division

(57) ABSTRACT

A control method for an information processing apparatus includes acquiring first information, about a first network, transmitted previously to another apparatus different from a communication apparatus by the information processing apparatus; and executing a predetermined process for transmitting second information about a second network to the communication apparatus based on the communication apparatus being able to communicate with a network using a second setting different from a first setting in a case that the second setting indicates an encryption method with higher security strength than an encryption method indicated by the first setting, the first setting being a setting that is indicated by the acquired first information and is for use in communication with the first network, and the second network being a network that is different from the first network and with which the information processing apparatus is able to communicate using the second setting.

19 Claims, 14 Drawing Sheets

(56) References Cited

U.S. PATENT DOCUMENTS

| | | | | |
|---|---|---|---|---|
| 2016/0094726 | A1* | 3/2016 | Abe | H04W 48/16 358/1.15 |
| 2019/0050186 | A1* | 2/2019 | Suga | G06F 3/1292 |
| 2022/0011992 | A1* | 1/2022 | Ehara | G06F 3/1236 |
| 2023/0061893 | A1* | 3/2023 | Sugawara | H04N 1/0035 |
| 2025/0370672 | A1* | 12/2025 | Matsumoto | G06F 3/1236 |
| 2025/0373516 | A1* | 12/2025 | Gupta | H04L 41/22 |

* cited by examiner

CONNECTION FORM
BEFORE CONNECTION
PROCESS VIA WIRELESS I/F

CONNECTION FORM
AFTER CONNECTION
PROCESS VIA WIRELESS I/F

FIG.5

501

| SETTING TARGET INFORMATION | |
|---|---|
| ITEM | VALUE |
| SSID | SSID_AAAAA |
| ENCRYPTION METHOD | WPA2 |
| FREQUENCY BAND | 2.4 GHz |
| PASSPHRASE | 12345678 |

502

| SUPPORT INFORMATION | |
|---|---|
| ITEM | VALUE |
| ENCRYPTION METHOD | WPA2, WPA3 |
| FREQUENCY BAND | 2.4 GHz, 5 GHz |

FIG.9

| USE RECORDS | | |
| --- | --- | --- |
| DATE AND TIME | PRINTING SUCCESS/ FAILURE | CAUSE OF PRINTING FAILURE |
| 2021/5/11 | SUCCESS | — |
| 2021/5/11 | FAILURE | COMMUNICATION ERROR |
| 2021/5/11 | SUCCESS | — |
| 2021/5/11 | FAILURE | COMMUNICATION ERROR |
| 2021/5/12 | FAILURE | COMMUNICATION ERROR |
| 2021/5/12 | SUCCESS | — |
| 2021/5/13 | SUCCESS | — |
| 2021/5/13 | FAILURE | INK OUT ERROR |
| 2021/5/16 | SUCCESS | — |
| 2021/5/16 | SUCCESS | — |

INFORMATION PROCESSING APPARATUS, CONTROL METHOD, AND STORAGE MEDIUM

BACKGROUND OF THE INVENTION

Field of the Invention

The present invention relates to an information processing apparatus, a control method, and a storage medium.

Description of the Related Art

Technologies by which an information processing apparatus transmits information for connecting to a network to a communication apparatus and the communication apparatus connects to the network using the information are known.

Japanese Patent Application Laid-Open No. 2020-123810 discusses a technique in which an external device transmits setting information for wireless communication to a communication apparatus and the communication apparatus performs wireless communication settings based on the setting information.

As the technologies by which an information processing apparatus transmits information for connecting to a network to a communication apparatus become widespread, there is a growing demand for a control to transmit more appropriate information for connecting to a network.

SUMMARY OF THE INVENTION

The present invention is directed to a control to transmit more appropriate information for connecting to a network.

According to an aspect of the present invention, a control method for an information processing apparatus includes acquiring first information about a first network, the first information being information transmitted previously to another apparatus different from a communication apparatus by the information processing apparatus, and executing a predetermined process for transmitting second information about a second network to the communication apparatus based on the communication apparatus being able to communicate with a network using a second setting different from a first setting in a case that the second setting is a setting indicating an encryption method with higher security strength than an encryption method indicated by the first setting, the first setting being a setting that is indicated by the acquired first information and is for use in communication with the first network, and the second network being a network that is different from the first network and with which the information processing apparatus is able to communicate using the second setting.

Further features of the present invention will become apparent from the following description of exemplary embodiments with reference to the attached drawings.

BRIEF DESCRIPTION OF THE DRAWINGS

FIG. 5 is a diagram illustrating an example of setting target information and support information according to an aspect of the present invention.

FIG. 9 is a diagram illustrating an example of table information according to an aspect of the present invention.

DESCRIPTION OF THE EMBODIMENTS

Various exemplary embodiments of the present invention will be described in detail below with reference to the accompanying drawings. It is to be noted that the exemplary embodiments described below are not intended to limit the claimed invention and that not all combinations of features according to the exemplary embodiments described below are always essential to a technical solution provided by the present invention.

A communication system including an information processing apparatus, a router apparatus, and a printer according to an aspect of the present invention will be described below with reference to FIGS. 1A and 1B.

Figure 1A:
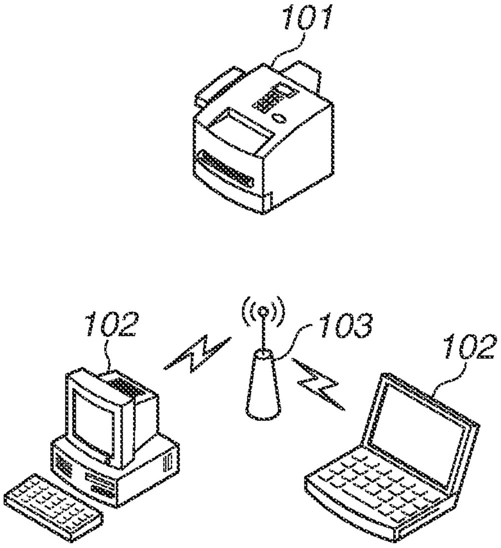
FIGS. 1A and 1B are schematic diagrams each illustrating a communication system.
Figure 1B:
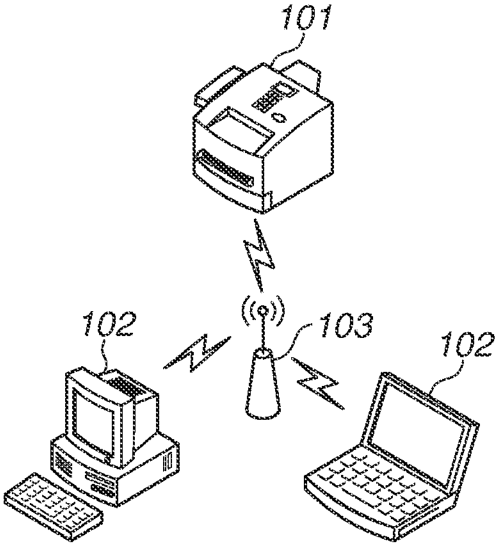

FIG. 1A illustrates a state where information processing apparatuses 102 and a router apparatus (access point) 103 are connected via a wireless local area network (wireless LAN). In this state, the information processing apparatuses 102 each have a wireless LAN communication function, and the communication in a connection setting process is performed wirelessly. FIG. 1B illustrates a state after a wireless connection process is performed from the state illustrated in FIG. 1A. In this state, a printer 101 is wirelessly connected to the router apparatus 103.

According to the present exemplary embodiment, various information processing apparatuses, such as smartphones, mobile phones, personal computers (PCs), tablet terminals, personal digital assistants (PDAs), and digital cameras are applicable to an information processing apparatus included in the communication system according to the present exemplary embodiment. While the printer 101 is described as an example of a communication apparatus of the communication system according to the present exemplary embodiment, the communication apparatus is not limited to the printer 101, and various apparatuses capable of wirelessly communicating with the information processing apparatus 102 are applicable. For example, printers, such as inkjet printers, full-color laser beam printers, and monochrome printers, are applicable. Not only printers but also copy machines, facsimile apparatuses, mobile terminals, smartphones, PCs, tablet terminals, PDAs, digital cameras, music reproduction devices, televisions, and smart speakers are applicable. Multi-function peripherals with a plurality of functions, such as copy, fax, and print functions, are also applicable.

Figure 2:
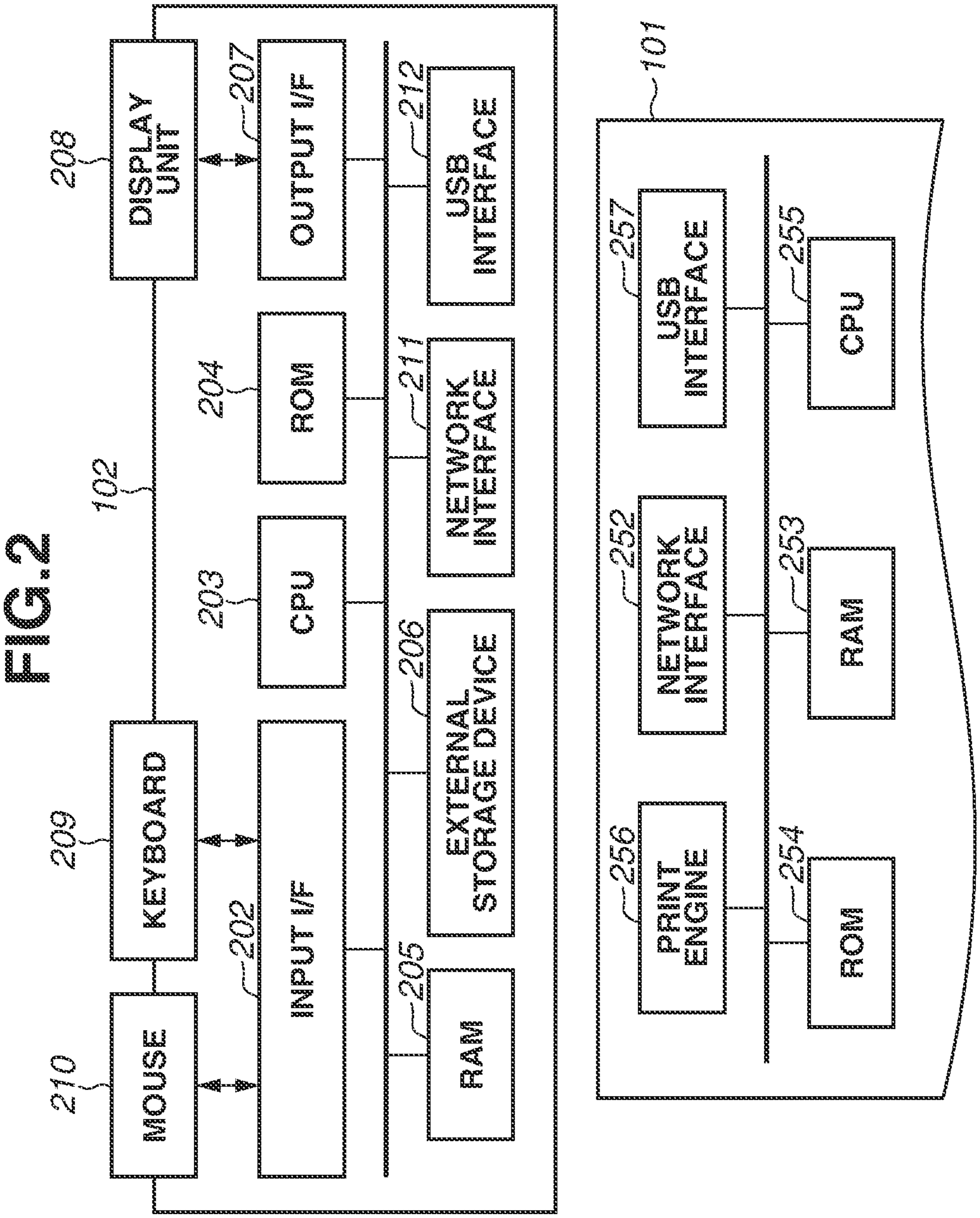
FIG. 2 is a diagram illustrating an example of a hardware configuration of each apparatus according to an exemplary embodiment of the present invention.

Next, hardware configurations of the printer 101 and the information processing apparatus 102 will be described below with reference to FIG. 2.

The information processing apparatus 102 includes an input interface (input I/F) 202, a central processing unit (CPU) 203, a read-only memory (ROM) 204, a random access memory (RAM) 205, an external storage device 206, an output interface (output I/F) 207, a display unit 208, a keyboard 209, a mouse 210, a network interface 211, and a universal serial bus (USB) interface 212. The network interface 211 controls wireless communication and communication processing via wired local area network (wired LAN) cables. The USB interface 212 controls USB connection via USB cables. The ROM 204 stores an initialization program, and the external storage device 206 stores application programs, an operating system (OS), printer drivers, and various data. The RAM 205 is used as a work memory by various programs stored in the external storage device 206. An embodiment in which Microsoft Windows® is used as an OS will be described below as an example.

The printer 101 includes a network interface 252, a RAM 253, a print engine 256, a ROM 254, and a CPU 255. The network interface 252 controls wireless communication and communication processing via wired LAN cables.

A USB interface 257 controls USB connection via USB cables. The RAM 253 is used as a main memory and a work memory of the CPU 255 and stores a reception buffer for temporarily storing received print jobs and received print data and stores various data. The print engine 256 performs printing based on data stored in the RAM 253. The ROM 254 stores various control programs and data for use by the control programs, and the CPU 255 controls the components of the printer 101 in accordance with the control programs.

While the processing distribution between the information processing apparatus 102 and the printer 101 is described above as an example, this distribution embodiment is not restrictive, and other embodiments may be employed.

Figure 3:
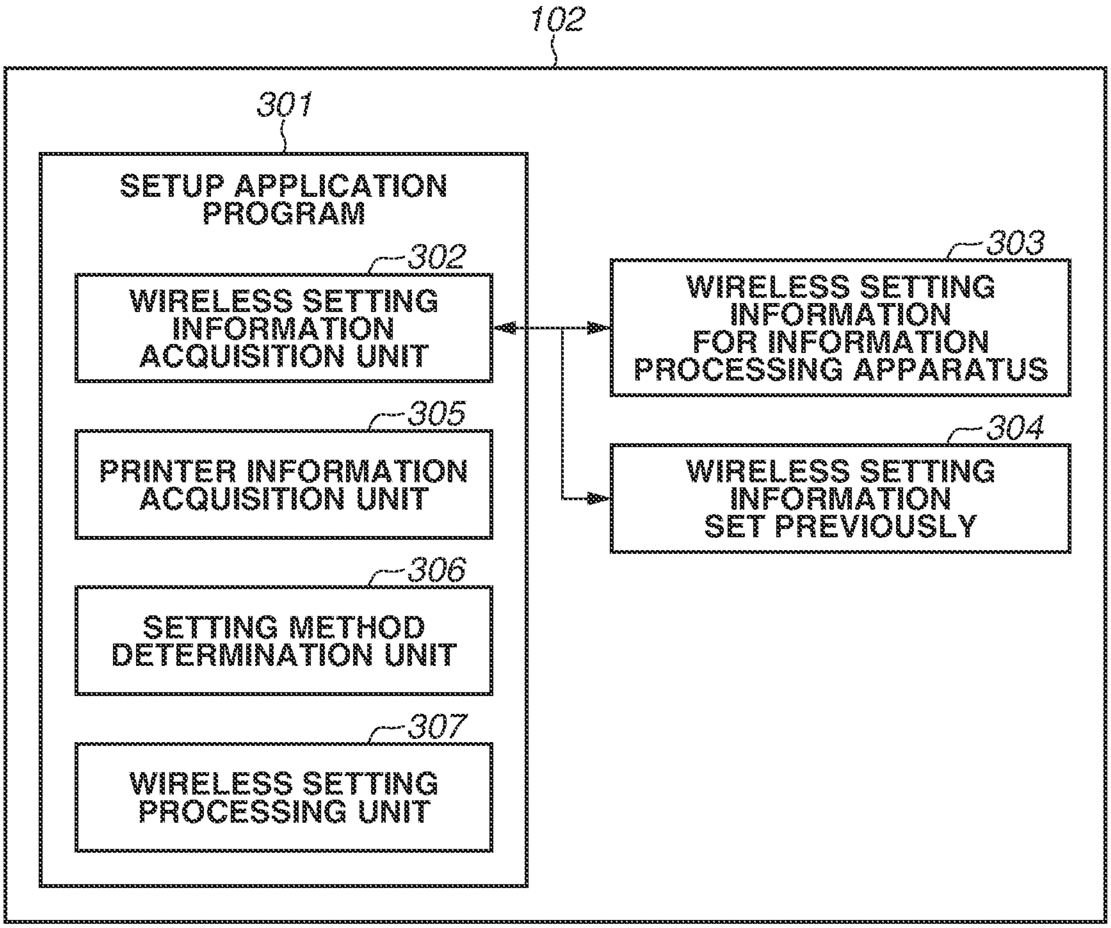
FIG. 3 is a diagram illustrating an example of a software configuration of an information processing apparatus according to an exemplary embodiment of the present invention.

Next, a software configuration according to the present exemplary embodiment will be described below with reference to FIG. 3. As illustrated in FIG. 3, the information processing apparatus 102 includes a setup application program (hereinafter, "setup application") 301. The setup application 301 includes a wireless setting information acquisition unit 302. The wireless setting information acquisition unit 302 acquires setting target information to be used for a wireless setting, from wireless setting information 303 that is used by the information processing apparatus 102 or wireless setting information 304 that has been set previously. The setup application 301 further includes a printer information acquisition unit 305. The printer information acquisition unit 305 acquires various information from the printer 101 through communication processes. The setup application 301 further includes a setting method determination unit 306 and a wireless setting processing unit 307. The setting method determination unit 306 determines an appropriate setting method based on the setting target information acquired by the wireless setting information acquisition unit 302 and the information acquired from the printer 101. The wireless setting processing unit 307 makes the wireless setting based on the setting method determined by the setting method determination unit 306. Exemplary embodiments of the setup application 301 will be described below with reference to flowcharts.

A first exemplary embodiment of the present invention will be described in detail below with reference to FIGS. 4 (consisting of 4A and 4B), 5, 6, and 7. A setup example in which the information processing apparatus 102 performs a setup on the printer 101 with security strength of the printer 101 reflected will be described below in the present exemplary embodiment.

Figure 4A:
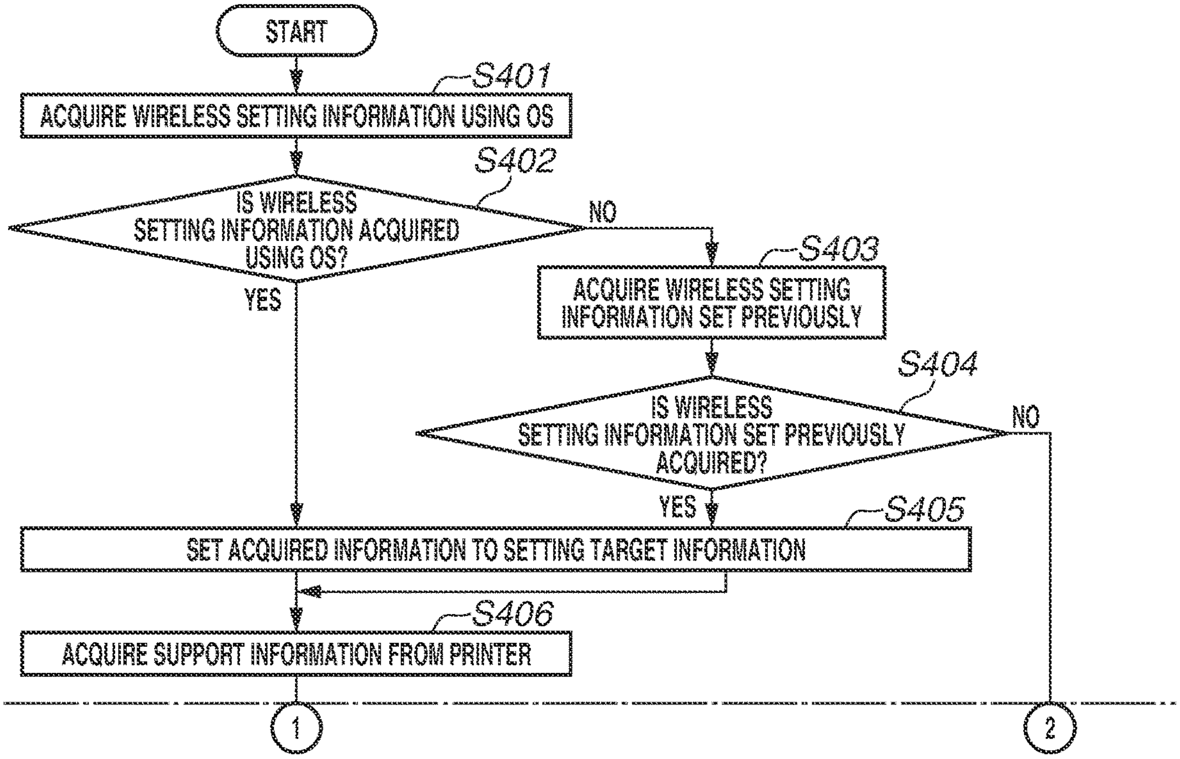
FIG. 4 (consisting of FIGS. 4A and 4B) is a flowchart according to a first exemplary embodiment of the present invention.
Figure 4B:
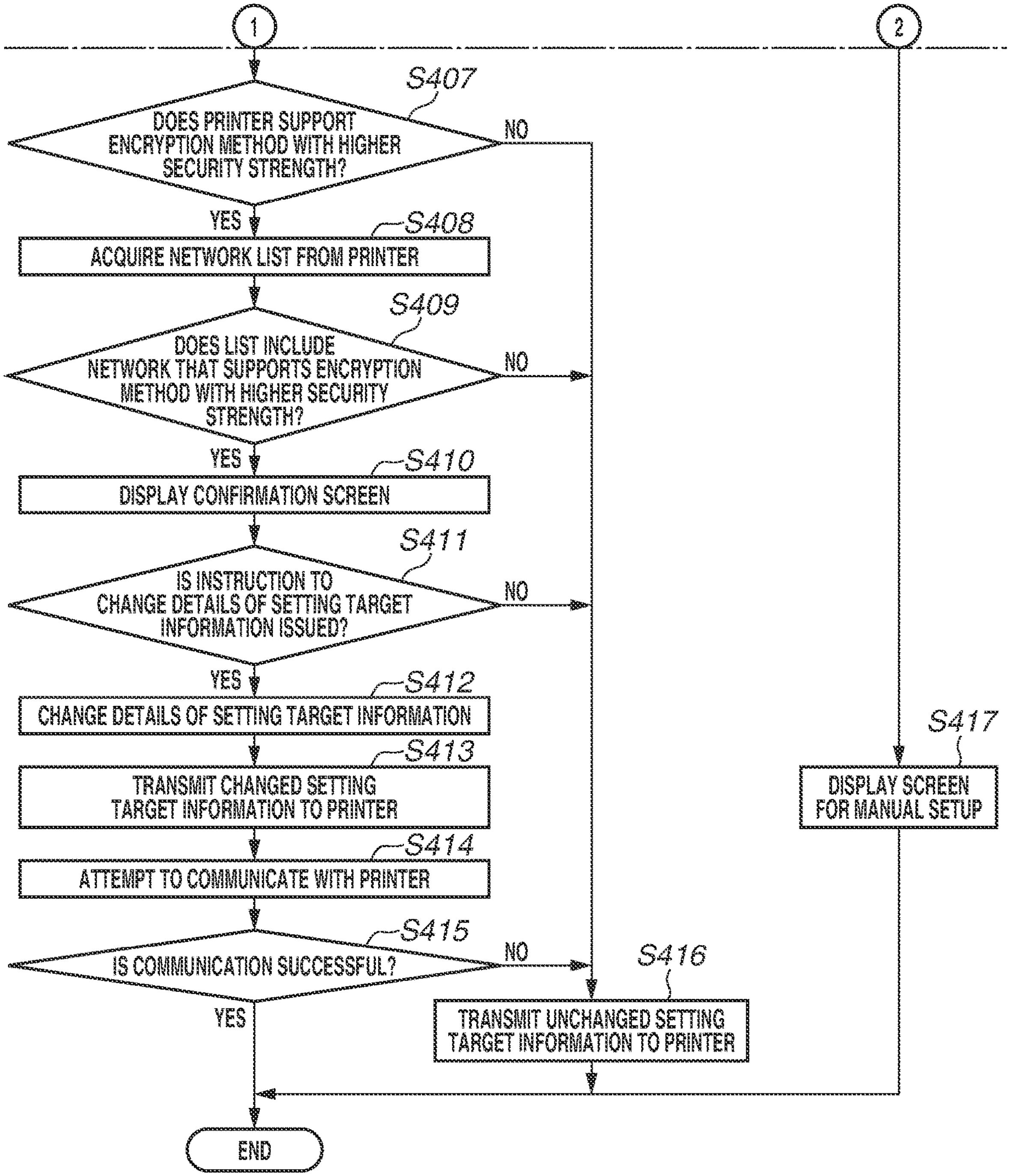

FIG. 4 (consisting of FIGS. 4A and 4B) is a flowchart illustrating a process in which the information processing apparatus 102 connects the printer 101 to a wireless LAN router. The process is realized by the CPU 203 loading a program stored in the ROM 204 or the external storage device 206 into the RAM 205 and executing the program.

Specifically, the process is performed based on a program stored as the setup application 301 in the external storage device 206. Hereinafter, a process performed by the setup application 301 is, in practice, a process realized by the CPU 203 executing the setup application 301. The process is initiated based on the setup application 301 having detected the execution of a trigger process that serves as a trigger for the process. Specific examples of a trigger process that serves as a trigger for the process include a process of activating the setup application 301 and a process of receiving predetermined input on a screen displayed by the setup application 301.

Initially, in step S401, the setup application 301 attempts to acquire the wireless setting information about a network to which the information processing apparatus 102 is connected and that is formed by the router apparatus using an application program interface (hereinafter, "API") of the OS. More specifically, the network to which the information processing apparatus 102 is connected is the network to which the information processing apparatus 102 is connected at the time of performing the trigger process that serves as a trigger for the process. The wireless setting information is used to connect to the network and indicates settings for use in communicating with the network. Specifically, for example, the wireless setting information includes information indicating a service set identifier (hereinafter, "SSID") of the network, a passphrase (password) for connecting to the network, an encryption method that is used by the network, and a frequency band that is used by the network. Specifically, the settings for use in communicating with the network are, for example, an encryption method setting and a frequency band setting. In some forms, a passphrase for connecting to a network cannot be acquired from the OS. In such forms, the setup application 301 displays a screen to prompt a user to input a passphrase and acquires the passphrase input to the screen.

Next, in step S402, the setup application 301 determines whether the wireless setting information is acquired in step S401. In a case where a determination result indicates YES (YES in step S402), the processing proceeds to step S405. In step S405, the wireless setting information acquired in step S401 is set and managed as setting target information. The setting target information is to be transmitted to the printer 101 and is information to be used for the wireless setting of the printer 101. In a case where the determination result indicates is NO (NO in step S402), the processing proceeds to step S403.

In step S403, the setup application 301 attempts to acquire wireless setting information transmitted previously as setting target information to another printer different from the printer 101. In a case where there is wireless setting information that the setup application 301 has been transmitted previously to another printer different from the printer 101, the setup application 301 stores the wireless setting information. Since wireless setting information transmitted previously to another printer different from the printer 101 includes a passphrase, it is unnecessary to display the screen for prompting the user to input a passphrase in this case.

In step S404, the setup application 301 determines whether wireless setting information transmitted previously as setting target information to another printer different from the printer 101 is acquired. In a case where the determination result indicates YES (YES in step S404), the processing proceeds to step S405. In step S405, the wireless setting information acquired in step S403 is set and managed as setting target information. In a case where the determination result indicates NO (NO in step S404), the processing proceeds to step S417. In step S417, a screen for manual setup is displayed. The manual setup according to the present exemplary embodiment is a method in which the user inputs wireless setting information to the printer 101 and the printer 101 connects to a network corresponding to the input wireless setting information. Thus, the screen displayed in step S417 may be a screen that prompts the user to connect the printer 101 and the network to each other with an operation on the printer 101. In step S417, a method in which wireless setting information input manually to the information processing apparatus 102 by the user is set as setting target information may be used. In such a case, a screen for inputting the wireless setting information may be displayed at this time, and the processing may proceed to step S405 after step S417. At this time, the wireless setting information input to the screen displayed in step S417 is set to setting target information in step S405. Other processes different from the above-described process may be performed in step S417. Specifically, for example, the setup application 301 may acquire a list as in step S408 described below, display the list, set information for connecting to a network selected from the list by the user to the setting target information, and transmit the information to the printer 101.

In step S405, the setup application 301 sets the setting target information, stores the setting target information, and thereafter establishes a Wi-Fi® connection between the information processing apparatus 102 and the printer 101. Specifically, in a case where the information processing apparatus 102 is Wi-Fi connected to the network formed by the wireless LAN router 103, the setup application 301 disconnects the Wi-Fi connection and thereafter establishes a Wi-Fi connection between the information processing apparatus 102 and the printer 101. The setup application 301 stores in advance information for Wi-Fi connecting to the printer 101, such as the SSID of the network formed by the printer 101. While the form in which a Wi-Fi connection is described to be established as a connection between the information processing apparatus 102 and the printer 101, this is not a limiting form. For example, a connection between the information processing apparatus 102 and the printer 101 may be established using a communication standard, such as Bluetooth®.

Bluetooth® includes Bluetooth® Low Energy and Classic Bluetooth®. In a case of this form, a connection is established between the information processing apparatus 102 and the printer 101 while a Wi-Fi connection between the information processing apparatus 102 and the network formed by the wireless LAN router 103 is maintained without being disconnected. Hereinafter, the information processing apparatus 102 and the printer 101 communicate with each other via the connection established as described above between the information processing apparatus 102 and the printer 101.

Thereafter, in step S406, the setup application 301 acquires support information from the printer 101. The support information indicates Wi-Fi communication capabilities supported by the printer 101. Specifically, for example, the support information includes information indicating frequency bands available for use by the printer 101 in Wi-Fi communication and information indicating encryption methods available for use by the printer 101 in Wi-Fi communication. The setting target information and the support information will be described below with reference to FIG. 5. The setting target information will be described below with reference to setting target information 501. The setting target information includes SSID, encryption method, and frequency band, as items. In the setting target information illustrated in FIG. 5, SSID_AAAA is set to a specific value for the SSID item, WI-FI CERTIFIED WPA2 (hereinafter, "WPA2") is set for the encryption method item, 2.4 GHZ is set for the frequency band item, and "12345678" is set for a passphrase item. Specifically, the setting target information indicates that the SSID of the network corresponding to the setting target information illustrated in FIG. 5 is SSID_AAAA, the encryption method that the network uses is WPA2, the frequency band that the network uses is 2.4 GHZ, and the passphrase that the network uses is 12345678. Next, the support information will be described below with reference to support information 502. The support information includes encryption method and frequency band as items. In the support information illustrated in FIG. 5, WPA2 and WPA3 are set to the encryption method, and 2.4 GHZ and 5 GHZ are set to the frequency band. Specifically, the support information illustrated in FIG. 5 indicates that the printer 101 having transmitted the support information supports the WPA2 and WPA3 encryption methods and the 2.4- and 5-GHZ frequency bands.

Next, in step S407, the setup application 301 performs a first determination process of comparing settings indicated by the setting target information set in step S405 and settings indicated by the support information acquired in step S406 to determine whether to change details of the setting target information. Specifically, the determination is a process of determining whether the encryption methods indicated by the support information include an encryption method with higher security strength than the encryption method indicated by the setting target information. In other words, the determination is a process of determining whether the printer 101 supports an encryption method with higher security strength than the encryption method indicated by the setting target information. In yet other words, the determination is a process of determining whether the printer 101 is able to communicate with any network through an encryption method with higher security strength than the encryption method indicated by the setting target information. In a case where a determination result indicates YES (YES in step S407), the processing proceeds to step S408. In a case where the determination result indicates NO (NO in step S407), the processing proceeds to step S416 without changing the setting target information.

Next, in step S408, the setup application 301 transmits a Simple Network Management Protocol (hereinafter, "SNMP") Get Request to the printer 101 to thereby acquire a list of one or more networks from the printer 101. While SNMP is described as an example of a protocol used in communication with the printer 101 according to the present exemplary embodiment, other protocols may be used. The list acquired herein is a list of networks discovered through a search for nearby networks by the printer 101 and is a list of networks to which the printer 101 is connectable. Specifically, in a case where the printer 101 supports the WPA2 and WPA3 encryption methods and the 2.4- and 5-GHZ frequency bands, the list may include a network that supports WPA2, a network that supports WPA3, a network that supports 2.4 GHZ, and a network that supports 5 GHZ. The above-described networks may also be referred to as access points.

Next, in step S409, the setup application 301 performs a second determination process of comparing the setting target information set in step S405 and the list acquired in step S408 to determine whether to change details of the setting target information. Specifically, the determination is a process of determining whether the list includes at least one network that supports an encryption method with higher security strength than the encryption method indicated by the setting target information. In other words, the determination is a process of determining whether at least one network included in the list supports an encryption method with higher security strength than the encryption method indicated by the setting target information. In a case where the determination result indicates YES (YES in step S409), the processing proceeds to step S410. In a case where the determination result indicates NO (NO in step S409), the processing proceeds to step S416 without changing the setting target information.

Figure 6:
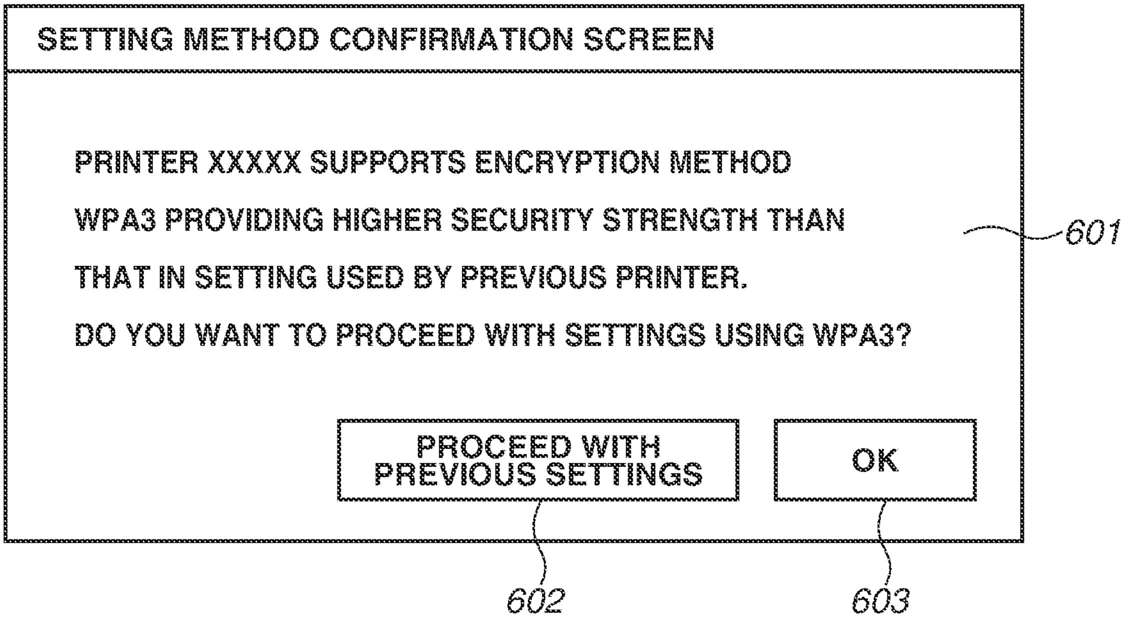
FIG. 6 is a diagram illustrating an example of a confirmation screen according to an aspect of the present invention.

Next, in step S410, the setup application 301 displays a confirmation screen for prompting the user to confirm whether to change details of the setting target information. FIG. 6 illustrates an example of the confirmation screen. The confirmation screen includes a message 601 indicating that an encryption method with higher security strength is also available, a button 602 for selection of not-changing details of the setting target information, and a button 603 for selection of changing details of the setting target information. The confirmation screen may display at least a part (e.g., SSID) of the wireless setting information about at least one network that supports an encryption method with higher security strength than the encryption method indicated by the setting target information.

Next, in step S411, the setup application 301 determines whether an instruction to change the details of the setting target information is issued by pressing the button 603. In a case where the button 603 is pressed and the determination result indicates YES (YES in step S411), the processing proceeds to step S412. In a case where the button 602 is pressed and the determination result indicates NO (NO in step S411), the processing proceeds to step S416 without changing the setting target information.

Next, in step S412, the setup application 301 sets, to the setting target information, wireless setting information about at least one network that supports an encryption method with higher security strength than the encryption method indicated by the setting target information among the networks included in the list. Specifically, the details of the setting target information are changed. The wireless setting information about which network is to be set to the setting target information is identified by, for example, displaying at least one network that supports an encryption method with higher security strength than the encryption method indicated by the setting target information among the networks included in the list and receiving selection from the user.

Figure 7:
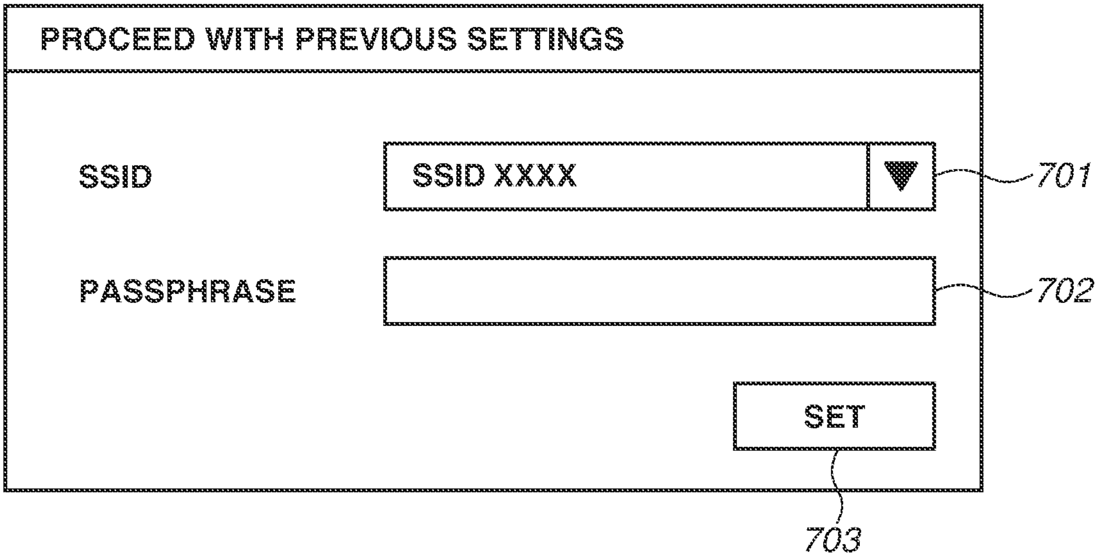
FIG. 7 is a diagram illustrating an example of a reception screen according to an aspect of the present invention.

FIG. 7 illustrates an example of a reception screen for receiving input regarding the wireless setting information about which network is to be set in the setting target information. The screen includes an area 701 for selecting a network from at least one network that supports an encryption method with higher security strength than the encryption method indicated by the setting target information among the networks included in the list. The screen further includes an area 702 for inputting a passphrase for connecting to the network selected in the area 701 and includes an area 703 for completing the input. In a case where the list includes only one network that supports an encryption method with higher security strength than the encryption method indicated by the setting target information, the network may be determined without receiving selection from the user. In a case where the area 703 is selected, the details of the setting target information are changed based on the information input to the screen. Thereafter, in step S413, the setup application 301 transmits the changed setting target information to the printer 101.

Next, in step S414, the setup application 301 attempts to communicate with the printer 101 via the network to which the information processing apparatus 102 is being connected. Prior to the attempt to communicate with the printer 101, the setup application 301 may change the network that is the connection destination of the information processing apparatus 102. For example, the information processing apparatus 102 may re-connect to the network to which the information processing apparatus 102 was connected before the establishment of the Wi-Fi connection between the information processing apparatus 102 and the printer 101 in step S405. For example, the information processing apparatus 102 may connect to the network corresponding to the wireless setting information transmitted as setting target information using the wireless setting information.

Next, in step S415, the setup application 301 determines whether the communication with the printer 101 is successful. In a case where the determination result indicates YES (YES in step S415), the process in the flowchart is ended. At this time, a process of receiving capability information from the printer 101 and registering the printer 101 in the setup application 301 may be performed. In a case where the determination result indicates NO (NO in step S415), the setting target information is changed again to the details before the change in step S413, and the processing proceeds to step S416. The flowchart may be ended even in a case where the determination result indicates NO, because there may be a case where, for example, while a connection is successfully established between the printer 101 and the network corresponding to the setting target information, the network is different from the network to which the information processing apparatus 102 is being connected. Thus, the communication with the printer 101 is unsuccessful. In the case where the determination result indicates NO, a screen indicating that the information processing apparatus 102 and the printer 101 cannot communicate with each other may be displayed.

In step S416, the setup application 301 transmits setting target information to the printer 101. The setting target information transmitted here is the wireless setting information acquired in step S401 and having remained unchanged from the wireless setting information acquired in step S401. Thereafter, the process in the flowchart is ended.

Through the foregoing process, a determination is made based on the wireless setting information acquired from the OS or the wireless setting information set previously and the support information about the printer 101 when the information processing apparatus 102 performs the connection setting process on the printer 101, so that a guidance on a setting with a higher security strength is provided to the user in a case where a setting with the higher security is determined to be available. This makes it possible to implement the settings that ensure security suitable for each environment. In addition, in determining setting target information, the wireless setting information is acquired from the OS before wireless setting information set previously is acquired, so that the information currently set for the information processing apparatus 102 is preferentially used to perform a setup, thus making the settings suitable for the current environment. Furthermore, use of the setting method confirmation screen illustrated in FIG. 6 enables the user to confirm details of the settings and then determine whether to proceed with the settings with higher security strength, and only the SSIDs with high security strength are listed and made selectable in FIG. 7 to thereby reduce the burden on the user in making the settings. In a case where the printer 101 does not support the settings with a higher strength or in a case where the wireless setting is not completed normally, the wireless setting information acquired from the OS or the wireless setting information set previously is set to thereby proceed with the settings, thus reducing the burden on the user.

A second exemplary embodiment of the present invention will be described in detail below with reference to FIGS. 8 (consisting of FIGS. 8A and 8B), 9, and 10. An example of a setup that the information processing apparatus 102 performs on the printer 101 based on use logs of the printer 101 in view of frequency bands of use will be described below in the present exemplary embodiment. Each frequency band for use in communication has characteristics, so that it is desirable to use a frequency band suitable for each use environment. According to the present exemplary embodiment, whether to provide guidance on another frequency band is determined based on communication error history for existing status of use and the provision of guidance is performed.

Figure 8A:
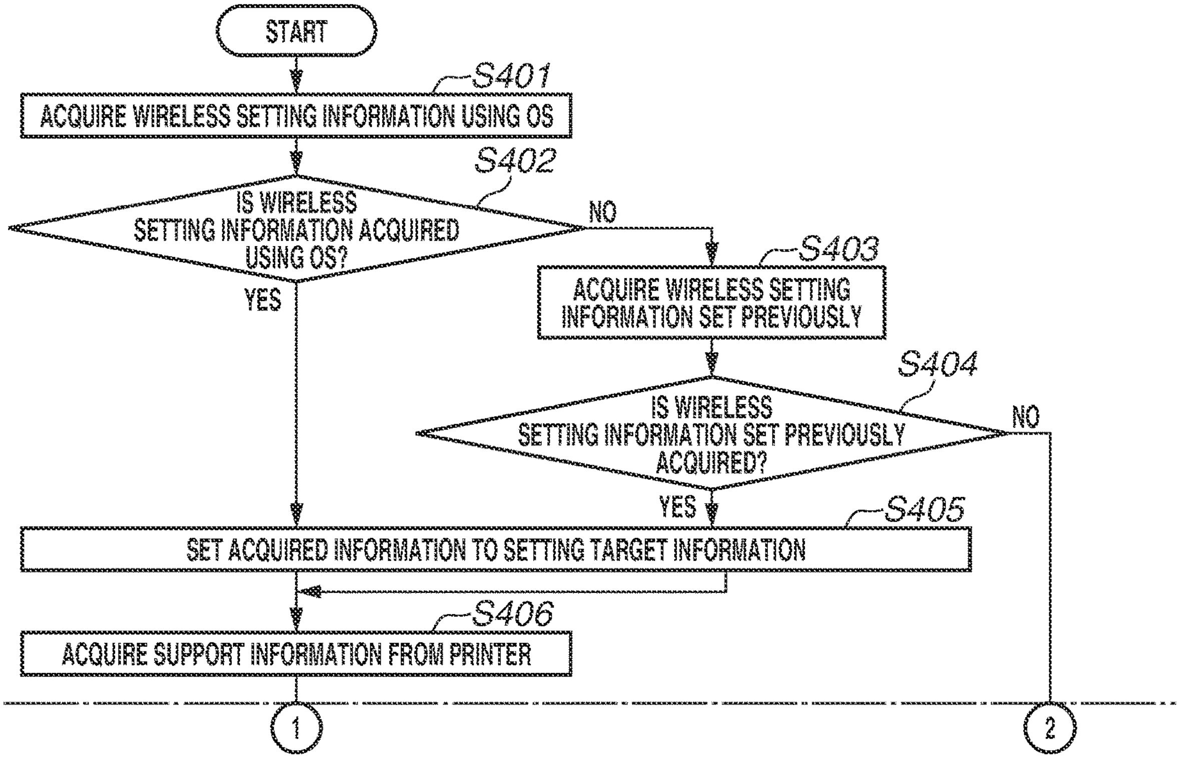
FIG. 8 (consisting of FIGS. 8A and 8B) is a flowchart according to a second exemplary embodiment of the present invention.
Figure 8B:
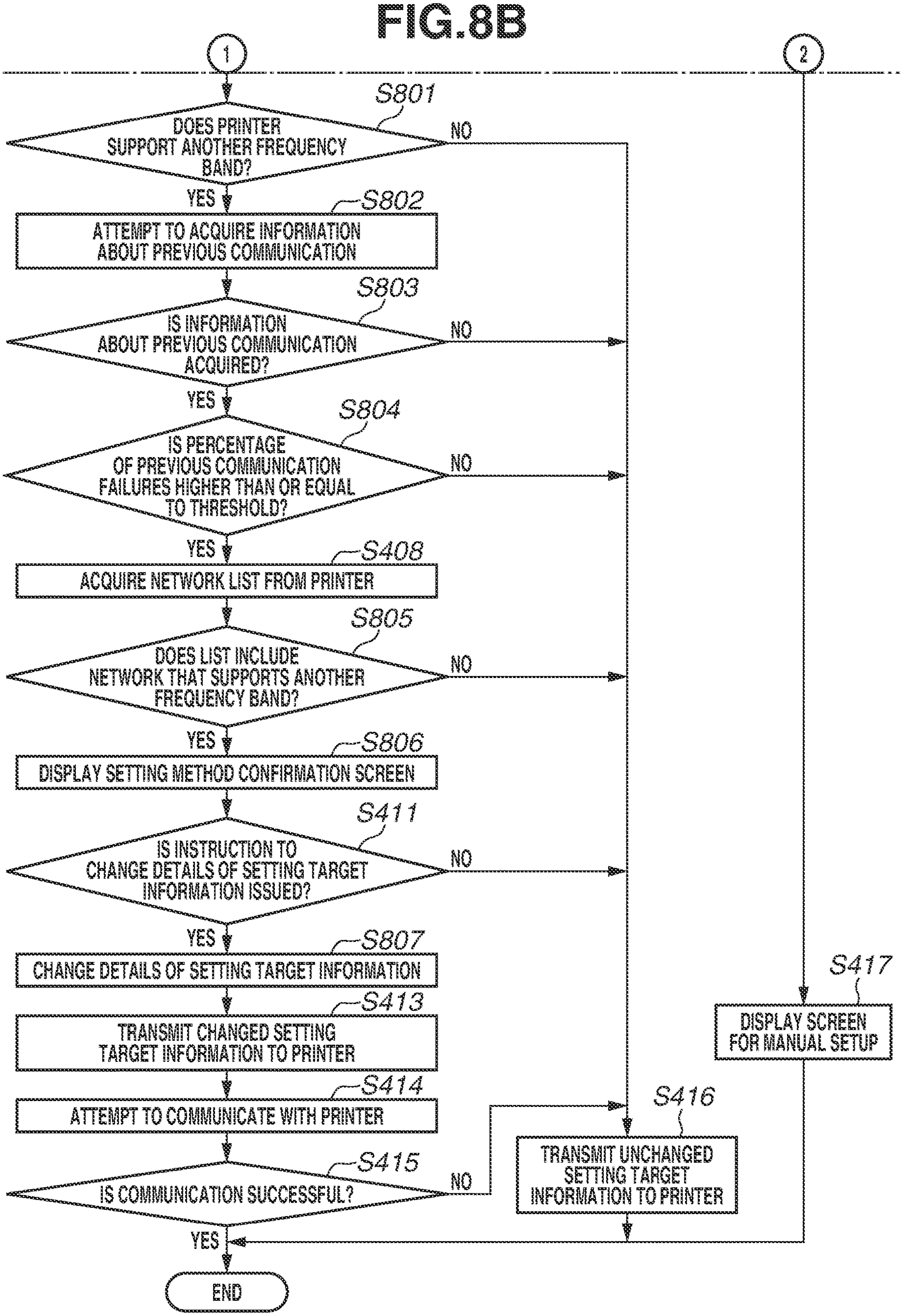

FIG. 8 (consisting of FIGS. 8A and 8B) is a flowchart illustrating a process in which the information processing apparatus 102 connects the printer 101 to the router apparatus 103. This process is realized by the CPU 203 loading a program stored in the ROM 204 or the external storage device 206 into the RAM 205 and executing the program.

Specifically, the process is performed based on the program stored as the setup application program 301 (setup application 301) in the external storage device 206. Hereinafter, the process performed by the setup application 301 is actually a process realized by the CPU 203 executing the setup application 301. The process is initiated in a case where the setup application 301 is activated. Redundant descriptions of each process corresponding to a process according to the first exemplary embodiment are omitted.

In step S801, the setup application 301 performs the first determination process of comparing the settings indicated by the setting target information set in step S405 and the settings indicated by the support information acquired in step S406 to determine whether to change details of the setting target information. Specifically, this determination is a process of determining whether the frequency bands indicated by the support information include a frequency band different from the frequency band indicated by the setting target information. In other words, the determination is a process of determining whether the printer 101 supports a frequency band different from the frequency band indicated by the setting target information. In yet other words, the determination is a process of determining whether the printer 101 is able to communicate with a network using a frequency band different from the frequency band indicated by the setting target information. In a case where a determination result indicates YES (YES in step S801), the processing proceeds to step S802. In a case where the determination result indicates NO (NO in step S801), the processing proceeds to step S416 without changing the setting target information.

Next, in step S802, the setup application 301 attempts to acquire communication log information about previous communications with other apparatuses via an access point corresponding to the setting target information set in step S405. Specifically, the communication log information is, for example, information about print jobs transmitted to other apparatuses via the access point corresponding to the setting target information set in step S405. In other words, the communication log information is information about previous status of use of the other apparatus. Specifically, the information about print jobs is, for example, table information illustrated in FIG. 9 including information indicating the transmission date and time of each print job, information indicating the success or failure of printing based on the print job, and information indicating a cause of the failure of printing based on the print job. The cause of the failure in printing based on the print job can be an error (communication error) in previous communication with another apparatus via the access point corresponding to the setting target information set in step S405. Other examples of the cause include an error (ink out error) caused by a shortage of ink in the other apparatus and an error (sheet out error) caused by a shortage of a sheet in the other apparatus. The other apparatus may be the printer 101 or another printer different from the printer 101.

Next, in step S803, the setup application 301 determines whether the communication log information is acquired. In a case where the setup application 301 has not communicated with another printer via the access point corresponding to the setting target information set in step S405 (there is no previous use record), no communication log information can be acquired.

Next, in step S804, the setup application 301 performs the second determination process of determining whether to change details of the setting target information based on the acquired communication log information. Specifically, the determination is a process of determining whether a percentage of failures of communications with the printer 101 via the access point corresponding to the setting target information set in step S405 is higher than or equal to a predetermined threshold. The predetermined threshold is, for example, 20%. Thus, the determination is, for example, a process of determining whether the percentage of printing failures caused by a communication error is higher than 20% of all printings. The all printings indicate one or more printings based on one or more print jobs transmitted previously from the setup application 301 via the communication with the printer 101 via the access point corresponding to the setting target information set in step S405. In a case where the determination result indicates YES (YES in step S804), the processing proceeds to step S408. In a case where the determination result indicates NO (NO in step S804), the processing proceeds to step S416 without changing the setting target information. The determination makes it possible to determine whether there is a high likelihood of a communication error occurring during communication using the frequency band indicated by the setting target information so that whether to change the setting target information is determinable.

In step S805 following step S408, the setup application 301 performs a fourth determination process of comparing the setting target information set in step S405 with the list acquired in step S408 to determine whether to change details of the setting target information. Specifically, the determination is a process of determining whether the list includes at least one network that supports a frequency band different from the frequency band indicated by the setting target information. For example, in a case where the frequency band indicated by the setting target information is 2.4 GHZ, whether the list includes at least one network that supports 5 GHZ is determined in the process. In a case where the determination result indicates YES (YES in step S805), the processing proceeds to step S806. In a case where the determination result indicates NO (NO in step S805), the processing proceeds to step S416 without changing the setting target information.

Figure 10:
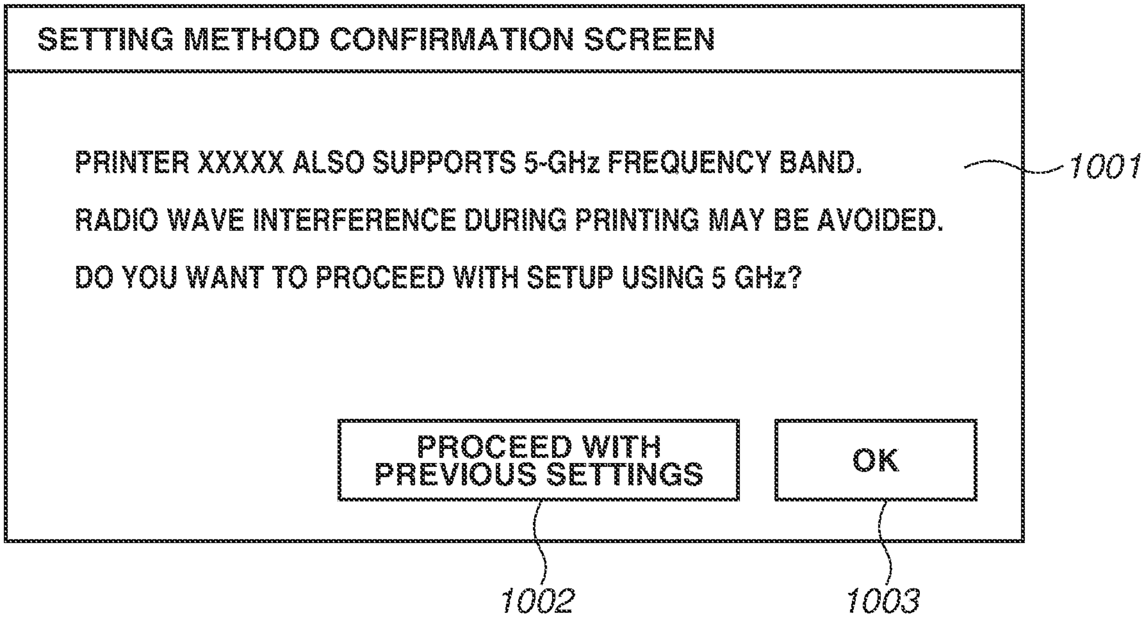
FIG. 10 is a diagram illustrating an example of a confirmation screen according to an aspect of the present invention.

Next, in step S806, the setup application 301 displays a confirmation screen for prompting the user to confirm whether to change the details of the setting target information. FIG. 10 illustrates an example of the confirmation screen. The confirmation screen includes a message 1001 indicating that a frequency band different from the frequency band indicated by the setting target information is also available, a button 1002 for not changing the content of the setting target information, and a button 1003 for changing the content of the setting target information. The confirmation screen may display at least a part (e.g., SSID) of the wireless setting information for at least one network that supports a frequency band different from the frequency band indicated by the setting target information.

In step S807 following step S411, the setup application 301 sets, to the setting target information, wireless setting information about at least one network that supports a frequency band different from the frequency band indicated by the setting target information among the networks included in the list. Specifically, details of the setting target information are changed. The wireless setting information about which network is to be set in the setting target information is identified by, for example, displaying at least one network that supports a frequency band different from the frequency band indicated by the setting target information among the networks included in the list and receiving selection from the user. A screen similar to the screen illustrated in FIG. 7 may be displayed herein. The screen includes an area for selecting a network from at least one network that supports a frequency band different from the frequency band indicated by the setting target information among the networks included in the list. In a case where the list includes only one network that supports a frequency band different from the frequency band indicated by the setting target information, the network may be identified without receiving selection from the user. In a case where an area for completing the input is selected, the details of the setting target information are changed based on the information input to the screen.

The foregoing process makes it possible to determine whether to provide guidance on a setting that uses another frequency band based on the wireless setting information acquired from the OS or the wireless setting information set previously and the support information and the communication log information about the printer 101 during the connection setting process performed on the printer 101 by the information processing apparatus 102 and to provide the guidance to the user.

Figure 11A:
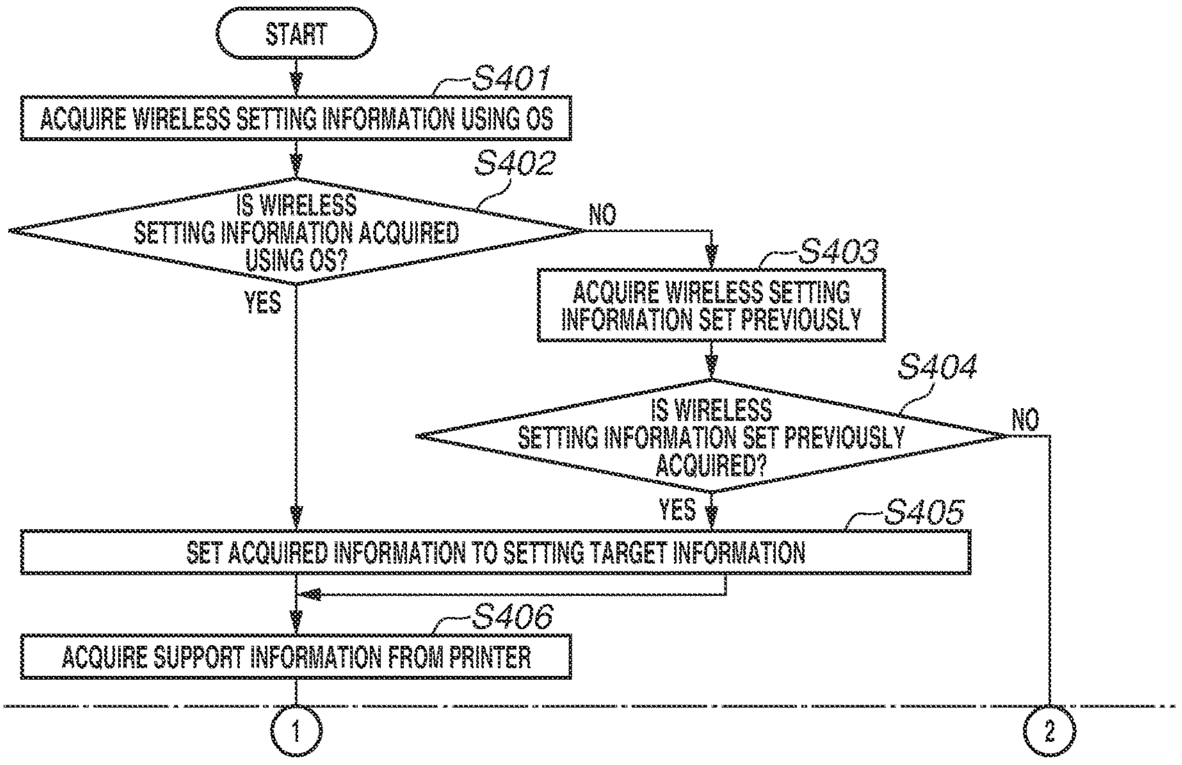
FIG. 11 (consisting of FIGS. 11A and 11B) is a flowchart according to a third exemplary embodiment of the present invention.
Figure 11B:
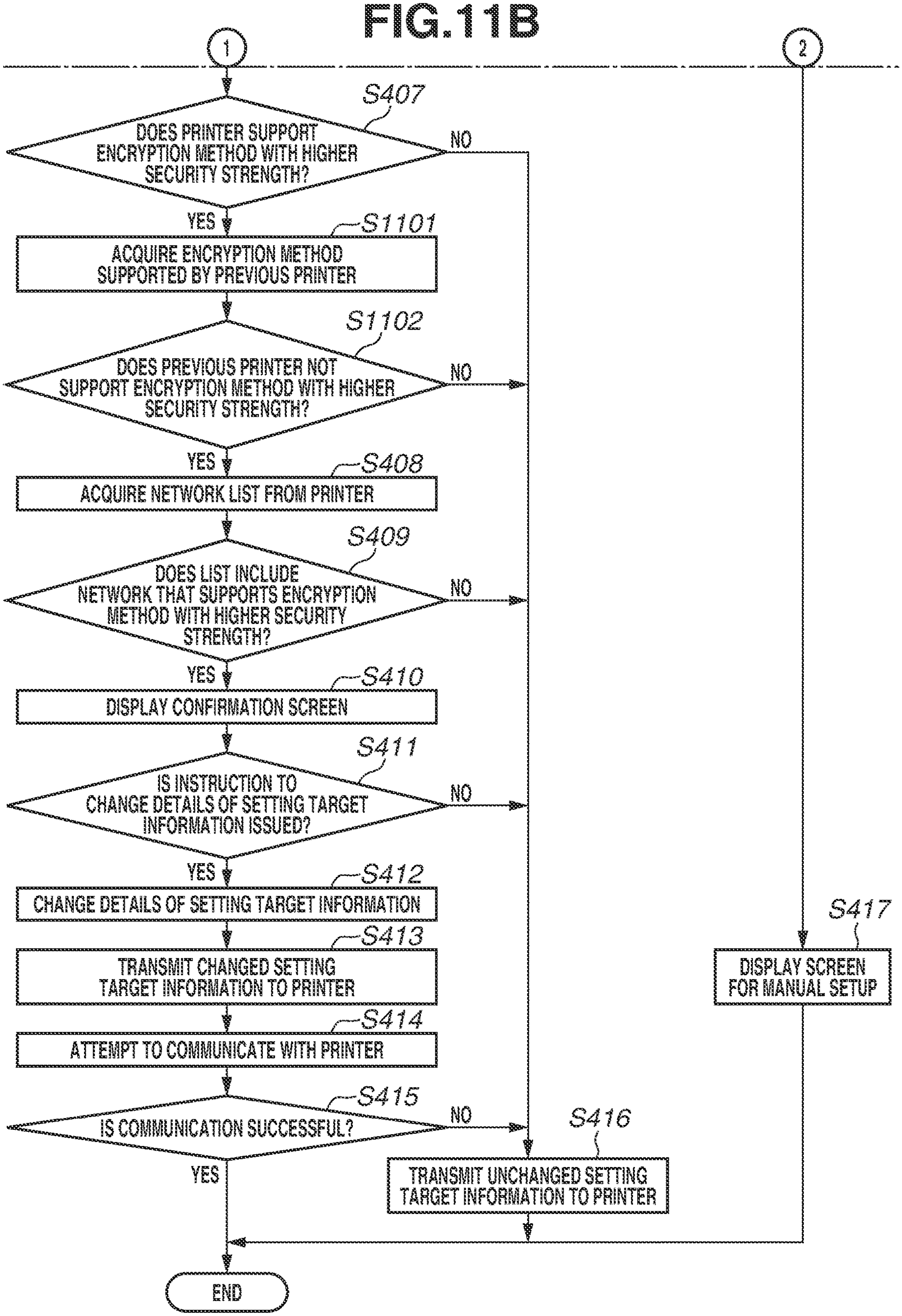

A third exemplary embodiment of the present invention will be described in detail below with reference to FIG. 11 (consisting of FIGS. 11A and 11B). A form according to the present exemplary embodiment in which even with the presence of a network that supports an encryption method with higher security strength than the encryption method indicated by the setting target information, the setting target information is not changed in a case where there is a high likelihood that the user is intentionally using the encryption method indicated by the setting target information will be described below.

FIG. 11 is a flowchart illustrating a process in which the information processing apparatus 102 connects the printer 101 to the router apparatus 103. This process is realized by the CPU 203 loading a program stored in the ROM 204 or the external storage device 206 into the RAM 205 and executing the program. Specifically, the process is performed by the program stored as the setup application program 301 (setup application 301) in the external storage device 206. Hereinafter, the process performed by the setup application 301 is, in practice, a process realized by the CPU 203 executing the setup application 301. The process is initiated in a case where the setup application 301 is activated. Redundant descriptions of each process corresponding to a process according to the first exemplary embodiment are omitted.

In step S1101 after step S407, support information is acquired from another printer that is different from the printer 101 serving as the setting target information transmission destination in the process and is registered in the setup application 301. The other printer also has been communicated through the setup application 301. The other printer may be a printer with which communication has been performed previously via the access point corresponding to the setting target information set in step S405.

Next, in step S1102, the setup application 301 performs a fifth determination process of comparing the setting target information set in step S405 and the support information acquired in step S406 to determine whether to change details of the setting target information. Specifically, this determination is a process of determining whether the encryption methods indicated by the support information include an encryption method with higher security strength than the encryption method indicated by the setting target information. In other words, the determination is a process of determining whether the other printer does not support an encryption method with higher security strength than the encryption method indicated by the setting target information. In a case where the encryption method indicated by the setting target information is an encryption method with low security strength although the other printer supports an encryption method with higher security strength than the encryption method indicated by the setting target information, there is a high likelihood that the user is intentionally using the encryption method with low security strength. Thus, in a case where the other printer supports an encryption method with higher security strength than the encryption method indicated by the setting target information, it is determined not to change the content of the setting target information. In a case where the other printer does not support an encryption method with higher security strength than the encryption method indicated by the setting target information, it is determined to change the details of the setting target information. In a case where the determination result indicates YES (YES in step S1102), the processing proceeds to step S408. In a case where the determination result indicates NO (NO in step S1102), the processing proceeds to step S416 without changing the setting target information.

The foregoing process makes it possible to switch the guidance based on details of support of the printer used previously even in a case where the printer 101 supports higher security strength than the wireless information for use in configuring the settings. This prevents unnecessary display of the setting confirmation screen for selecting whether to make the settings with high security strength, thus reducing the load on the user.

While the operations in steps S403 and S404 are performed after the determination in step S402 is performed in the above-described form, this is not a limiting form. For example, the operations in steps S403 and S404 may be performed first, and in a case where the determination result in step S404 indicates NO, the processing proceeds to step S402, whereas in a case where the determination result in step S404 indicates YES, the processing proceeds to step S405. In a case where the determination result step S402 indicates NO, the processing proceeds to step S417, whereas in a case where the determination result step S402 indicates YES, the processing proceeds to step S405.

A form in which the operations in steps S403 and S404 are not performed may be employed. In such a form, in a case where the determination result in step S402 indicates NO, the processing proceeds to step S417, whereas in a case where the determination result in step S402 indicates YES, the processing proceeds to step S405. A form in which the determination in step S402 is not performed may be employed. In such a case, the operations in steps S403 and S404 are performed after step S401.

The first and second exemplary embodiments may be combined together or may be performed in combination with each other. Specifically, for example, the operations in steps S801 to S807 may be performed in a case where the determination result step S407 indicates NO.

It is obvious that the purpose of the present invention is achieved also by supplying a recording medium storing program codes of software for realizing the functions of the above-described exemplary embodiments to a system or an apparatus and causing a computer (or a CPU or a microprocessing unit (MPU)) of the system or the apparatus to read the program codes stored in the recording medium and execute the read program codes. In this case, the program codes read from the storage medium realize the functions of the above-described exemplary embodiments, and the storage medium storing the program codes constitutes the present invention.

For example, a flexible disk, a hard disk, an optical disk, a magneto-optical disk, a compact disk (CD) ROM (CD-ROM), a CD-recordable (CD-R), a magnetic tape, a nonvolatile memory card, a ROM, or a digital versatile disk (DVD) may be used as the storage medium for supplying the program codes.

It is obvious that not only cases where the functions of the above-described exemplary embodiments are realized by the computer by executing the program codes read by the computer but also cases where an OS running on the computer performs part or all of the actual processes based on instructions of the program codes and the functions of the above-described exemplary embodiments are realized by the processes are also encompassed.

Furthermore, it is obvious that cases where after the program codes read from the storage medium are written to a memory of a function expansion board inserted in the computer or a function expansion unit connected to the computer, a CPU of the function expansion board or the function expansion unit performs part or all of the actual processes based on the instructions of the program codes and the functions of the above-described exemplary embodiments are realized by the processes are also encompassed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-053293, filed Mar. 29, 2023, which is hereby incorporated by reference herein in its entirety.

What is claimed is:

1. A control method for an information processing apparatus, the control method comprising:

acquiring first information about a first network, the first information being information transmitted previously to another apparatus different from a communication apparatus by the information processing apparatus;

attempting to acquire third information indicating a network to which the information processing apparatus is being connected; and executing a predetermined process for transmitting second information about a second network to the communication apparatus based on the communication apparatus being able to communicate with a network using a second setting different from a first setting, wherein the predetermined process is executed in a case that the third information is acquired and the second setting is a setting indicating an encryption method with higher security strength than an encryption method indicated by a third setting and in a case that the third information is not acquired and the second setting is the setting indicating the encryption method with higher security strength than the encryption method indicated by the first setting, the first setting being a setting that is indicated by the acquired first information and is for use in communication with the first network, the second network being a network that is different from the first network and with which the information processing apparatus is able to communicate using the second setting, and the third setting being a setting that is indicated by the acquired third information and is for use in communication with the network to which the information processing apparatus is being connected.

2. The control method according to claim 1, wherein the predetermined process includes a process of acquiring a list of one or more networks, and wherein the second information is information about the second network included in the list.

3. The control method according to claim 2, wherein the list is a list of one or more networks discovered by the communication apparatus, and wherein the list is acquired from the communication apparatus.

4. The control method according to claim 2, wherein the predetermined process includes a process of identifying, from the list, a network corresponding to the second setting, and wherein the second network is a network identified as the network corresponding to the second setting.

5. The control method according to claim 1, wherein the predetermined process includes a process of displaying a predetermined confirmation screen, and wherein the first information is transmitted to the communication apparatus based on a first input having been performed on the predetermined confirmation screen, and the second information is transmitted to the communication apparatus based on a second input having been performed on the predetermined confirmation screen.

6. The control method according to claim 1, further comprising acquiring, from the communication apparatus, support information indicating communication capabilities supported by the communication apparatus, wherein the predetermined process is performed based on the communication apparatus having been identified, based on the support information, as being able to communicate with a network using the second setting.

7. The control method according to claim 1, further comprising:

attempting to communicate with the communication apparatus via a network to which the information processing apparatus is being connected after the second information is transmitted to the communication apparatus; and transmitting the first information to the communication apparatus based on a failure of the communicate with the communication apparatus via a network to which the information processing apparatus is being connected, after the second information is transmitted to the communication apparatus.

8. The control method according to claim 1, wherein the attempting to acquire the third information is executed by an application program interface of an operating system (OS).

9. The control method according to claim 1, wherein, in a case that the second setting is not the setting indicating the encryption method with higher security strength than the encryption method indicated by the first setting, the predetermined process is not executed and a process configured to transmit the first information to the communication apparatus is executed.

10. The control method according to claim 9, wherein the second setting is a setting indicating an encryption method with higher security strength than an encryption method indicated by the first setting.

11. The control method according to claim 1, wherein the first setting and the second setting are each a setting related to a frequency band.

12. The control method according to claim 11, wherein, among a first frequency band and a second frequency band, the second setting is a setting indicating a frequency band different from a frequency band indicated by the first setting.

13. The control method according to claim 12, further comprising acquiring information about previous communication using the frequency band indicated by the first setting, wherein whether to transmit the first information to the communication apparatus or to transmit the second information to the communication apparatus is controlled based on the information about the previous communication.

14. The control method according to claim 13, wherein, in a case where a percentage of the previous communication having resulted in failure is not higher than a predetermined threshold, the control is performed to transmit the first information to the communication apparatus irrespective of the communication apparatus being able to communicate with a network using the second setting, whereas in a case where the percentage of the previous communication having resulted in failure is higher than the predetermined threshold and the communication apparatus is able to communicate with a network using the second setting, the control is performed to transmit the second information to the communication apparatus.

15. The control method according to claim 12, wherein the first frequency band and the second frequency band are 2.4- and 5-GHz frequency bands.

16. The control method according to claim 1, wherein the communication apparatus is a printing apparatus.

17. The control method according to claim 1, further comprising transmitting a print job for causing the communication apparatus to perform printing.

18. A non-transitory computer-readable storage medium storing a program for causing a computer of an information processing apparatus to:

acquire first information about a first network, the first information being information transmitted previously to another apparatus different from a communication apparatus by the information processing apparatus;

attempt to acquire third information indicating a network to which the information processing apparatus is being connected; and execute a predetermined process for transmitting second information about a second network to the communication apparatus based on the communication apparatus being able to communicate with a network using a second setting different from a first setting, wherein the predetermined process is executed in a case that the third information is acquired and the second setting is a setting indicating an encryption method with higher security strength than an encryption method indicated by a third setting and in a case that the third information is not acquired and the second setting is the setting indicating the encryption method with higher security strength than the encryption method indicated by the first setting, the first setting being a setting that is indicated by the acquired first information and is for use in communication with the first network, the second network being a network that is different from the first network and with which the information processing apparatus is able to communicate using the second setting, and the third setting being a setting that is indicated by the acquired third information and is for use in communication with the network to which the information processing apparatus is being connected.

19. An information processing apparatus comprising:

an acquisition unit configured to acquire first information about a first network, the first information being information transmitted previously to another apparatus different from a communication apparatus by the information processing apparatus, and to attempt to acquire third information indicating the network to which the information processing apparatus is being connected; and an execution unit to execute a predetermined process for transmitting second information about a second network to the communication apparatus based on the communication apparatus being able to communicate with a network using a second setting different from a first setting, wherein the predetermined process is executed in a case that the third information is acquired and the second setting is a setting indicating an encryption method with higher security strength than an encryption method indicated by a third setting and in a case that the third information is not acquired and the second setting is the setting indicating the encryption method with higher security strength than the encryption method indicated by the first setting, the first setting being a setting that is indicated by the acquired first information and is for use in communication with the first network, the second network being a network that is different from the first network and with which the information processing apparatus is able to communicate using the second setting, and the third setting being a setting that is indicated by the acquired third information and is for use in communication with the network to which the information processing apparatus is being connected.

* * * * *